(12) United States Patent
Kommula et al.

(10) Patent No.: US 10,659,391 B1
(45) Date of Patent: May 19, 2020

(54) METHODS AND APPARATUS TO PRESERVE PACKET ORDER IN A MULTI-FABRIC VIRTUAL NETWORK

(71) Applicant: VMware, Inc., Palo Alto, CA (US)

(72) Inventors: Raja Kommula, Cupertino, CA (US); Thayumanavan Sridhar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/255,580

(22) Filed: Jan. 23, 2019

(51) Int. Cl.
*H04L 12/28* (2006.01)
*H04L 12/933* (2013.01)
*H04L 12/947* (2013.01)

(52) U.S. Cl.
CPC ........... *H04L 49/15* (2013.01); *H04L 49/252* (2013.01)

(58) Field of Classification Search
None
See application file for complete search history.

(56) References Cited

U.S. PATENT DOCUMENTS

| | | | |
|---|---|---|---|
| 8,204,061 B1 | 6/2012 | Sane et al. | |
| 2012/0033672 A1 | 2/2012 | Page et al. | |
| 2013/0088971 A1 | 4/2013 | Anantharam et al. | |
| 2014/0003436 A1* | 1/2014 | Wang | H04L 45/7457 370/392 |
| 2014/0105213 A1* | 4/2014 | A K | H04L 45/66 370/392 |
| 2014/0196037 A1* | 7/2014 | Gopalan | G06F 9/4856 718/1 |
| 2014/0250220 A1* | 9/2014 | Kapadia | H04L 12/4625 709/224 |
| 2015/0312134 A1 | 10/2015 | Kapadia et al. | |
| 2016/0091685 A1 | 3/2016 | Raza et al. | |
| 2017/0019328 A1* | 1/2017 | Moreno | H04L 45/22 |
| 2017/0026461 A1 | 1/2017 | Boutros et al. | |
| 2017/0085395 A1 | 3/2017 | Koponen et al. | |
| 2018/0176145 A1 | 6/2018 | Sharma et al. | |

(Continued)

FOREIGN PATENT DOCUMENTS

WO 2015069573 5/2015

OTHER PUBLICATIONS

International Searching Authority, "International Search Report," dated Nov. 7, 2019 in connection with International Patent Application No. PCT/US2019/043114 (5 pages).

(Continued)

*Primary Examiner* — Clemence S Han
(74) *Attorney, Agent, or Firm* — Hanley, Flight & Zimmerman, LLC

(57) ABSTRACT

An example to preserve packet order in a multi-fabric network includes: a migration detector to, after a first host sends a first packet of a first packet flow via a first active link between a first host and a first top-of-rack (TOR) switch, detect a migration of the first active link to a second active link between the first host and a second TOR switch, the first packet destined to a second host connected to the second TOR switch; and a migration notifier to, in response to the migration, send a migration notification message to cause configuration of the second TOR switch to send a second packet of the first packet flow to the first TOR switch via an inter-switch link between the first and second TOR switches, the second packet destined to the second host.

20 Claims, 6 Drawing Sheets

PACKET-ORDER PRESERVATION THROUGH INTER-SWITCH LINK

(56) References Cited

U.S. PATENT DOCUMENTS

| | | |
|---|---|---|
| 2019/0020555 A1* | 1/2019 | Tayal .................. G06F 9/45533 |
| 2019/0020575 A1 | 1/2019 | Manthiramoorthy et al. |
| 2019/0028382 A1* | 1/2019 | Kommula ........... H04L 47/2433 |
| 2019/0230011 A1 | 7/2019 | Gandham et al. |
| 2019/0230035 A1 | 7/2019 | Rao et al. |
| 2019/0280968 A1* | 9/2019 | Sreenivasagaperumal .................. H04L 45/16 |
| 2020/0036632 A1 | 1/2020 | Kommula et al. |

OTHER PUBLICATIONS

International Searching Authority, "Written Opinion," dated Nov. 7, 2019 in connection with International Patent Application No. PCT/US2019/043114 (7 pages).

Green, "LAG vs. LBT for vSwitch Uplinks in vSphere," Mar. 26, 2015, Virtualization & Cloud Review, retrieved on Oct. 29, 2019 [https://virtualizationreview.com/articles/2015/03/26/load-balancing-vsphere-vswitch-uplinks.aspx] (5 pages).

United States Patent and Trademark Office, "Notice of Allowance," dated Sep. 11, 2019 in connection with U.S. Appl. No. 16/044,296 (8 pages).

Xiapu Luo et al., "Design and Implementation of TCP Data Probes for Reliable and Metric-Rich Network Path Monitoring," USENIX'09 Proceedings of the 2009 Conference on USENIX Annual Technical Conference, Jun. 2009, 15 pages.

United States Patent and Trademark Office, "Supplemental Notice of Allowability," dated Feb. 11, 2020 in connection with U.S. Appl. No. 16/044,296, 2 pages.

United States Patent and Trademark Office, "Notice of Allowance," dated Feb. 26, 2020 in connection with U.S. Appl. No. 16/255,583, 7 Pages.

* cited by examiner

OUT-OF-ORDER PACKETS RESULTING FROM ACTIVE LINK TRANSITION

PACKET-ORDER PRESERVATION THROUGH INTER-SWITCH LINK

METHODS AND APPARATUS TO PRESERVE PACKET ORDER IN A MULTI-FABRIC VIRTUAL NETWORK

FIELD OF THE DISCLOSURE

The present disclosure relates generally to network-based computing and, more particularly, to methods and apparatus to preserve packet order in a multi-fabric virtual network.

BACKGROUND

Virtualizing computer systems provides benefits such as the ability to execute multiple virtual computer systems on a single hardware computer, replicating computer systems, moving virtual computer systems among multiple hardware computers, and so forth. "Infrastructure as a Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and network resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many hardware processor units (e.g., servers). The hardware processor units may be installed in standardized frames, known as racks, which provide efficient use of floor space by allowing the hardware processor units to be stacked vertically. The racks may additionally include other components of a cloud computing environment such as storage devices, network devices (e.g., switches), etc.

Figure 1:
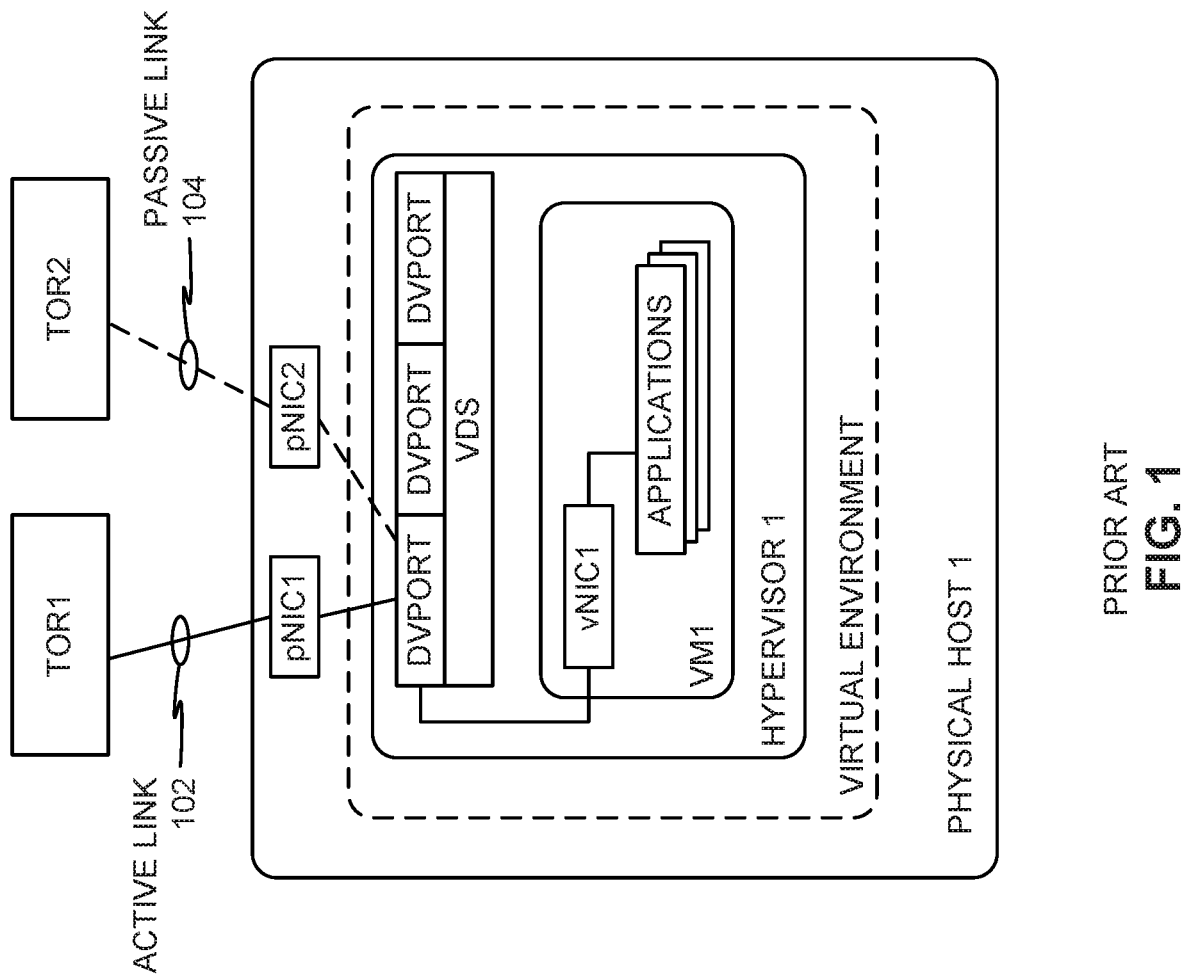
FIG. 1 is an example network topology in which a Load-Based Teaming (LBT) policy is used for load balancing across physical network interface cards (pNICs) that connect a physical host to two top-of-rack (TOR) switches in a physical server rack.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Modern datacenters are equipped with physical racks in which multiple physical server hosts are installed. As used herein, the terms "server host" and "host" refer to a composition of physical hardware resources such as a physical server. The composition of physical hardware resources may be contained in a single physical unit or may be distributed across multiple physical locations and logically aggregated to form a "server host" or "host". A "server host" or "host" may be configured or allocated, partially or as a whole, to a virtual rack and/or workload; powered on or off in its entirety; and/or may otherwise be considered a complete functional unit. At the time of this writing, a physical server host ("host") typically includes up to four 10/25 gigabit-per-second (Gbps) physical network interface cards (pNICs) for high-availability purposes. These pNICs are typically connected to one or more switches called Top-of-Rack (TOR) switches of corresponding physical racks. In some instances, hosts in datacenters can be equipped with two or more pNICs, which are connected to multiple TOR switches for redundancy. This kind of connectivity provides a host with connectivity to other hosts via multiple network fabrics across the multiple TOR switches. For example, a first network fabric may connect a source host to a destination host via one or more switches using a first pNIC of the source host, and a second network fabric may connect the source host to the same destination host via another one or more switches using the same first pNIC or a second pNIC of the source host. As such, a network fabric enables communications between two hosts across a network via a network path that is different from another network of another network fabric between the same two hosts. The multiple network fabrics provide multiple ways to balance network traffic load(s) across multiple pNICs of a host. To implement a virtual network, a host includes a virtual network (vnetwork) distributed switch (VDS) in which multiple distributed virtual ports (dvports) can be instantiated to operate as virtual-to-physical network conduits between pNICs of the host and virtual network interface cards (vNICs) of virtual machines (VMs) running on the host so that network traffic of the VMs can flow between the virtual network to which the VMs are connected and a physical network through which the pNICs of the host connect to the TOR switches.

In some datacenters, administrators employ a Load-Based Teaming (LBT) policy for load balancing network traffic across network links. LBT, also known as "route based on physical NIC load," is a load balancing network protocol used to load balance network traffic across different pNICs based on link utilizations of active pNICs. When an application in a VM makes a request for a network connection to communicate over a network, a dvport is created and/or allocated to the requesting application and is bound to a pNIC. In this manner, the pNIC is the physical network resource that serves the dvport in the virtual network. In some instances, the dvport may be bound to multiple pNICs. However, the dvport is active on only one pNIC at a time (e.g., a dvport is not active across two pNICs at a same time). Making a dvport active on only one pNIC at a time is referred to as operating in Active-Passive mode.

An example active link and passive link configuration for a dvport is illustrated in FIG. 1, in which a solid line between a TOR1 switch and pNIC1 represents an active link 102 of an LBT configuration, and a dashed line between a TOR 2 switch and pNIC2 represents a passive link 104 of the LBT configuration. Subsequent requests for network connections can result in additional dvports being created and bound to a pNIC on which one or more existing dvports are already active. (Two or more dvports may be active on the same pNIC at the same time.) When the utilization of the pNIC exceeds 75% of the total network traffic capacity of the pNIC, one or more dvports assigned to the pNIC is/are moved to a different, less utilized pNIC. Thus, employing LBT involves initially selecting only one pNIC for all outgoing traffic of a dvport, and multiple created/allocated dvports must share the single pNIC until the 75% utilization threshold is exceeded for that pNIC. Only after the 75% utilization threshold is exceeded for the pNIC does the LBT policy permit moving one or more dvports onto a less utilized pNIC so that none of the active pNICs exceeds the 75% utilization threshold. Another policy consideration when implementing LBT is that the active status of dvport on a pNIC is applicable only to outgoing (egress) traffic from the dvport to a TOR switch. That is, egress traffic is sent from the dvport only on the active pNIC link, while incoming (ingress) traffic from one or more TOR switches is accepted by the dvport from any active or passive pNIC link.

Figure 2:
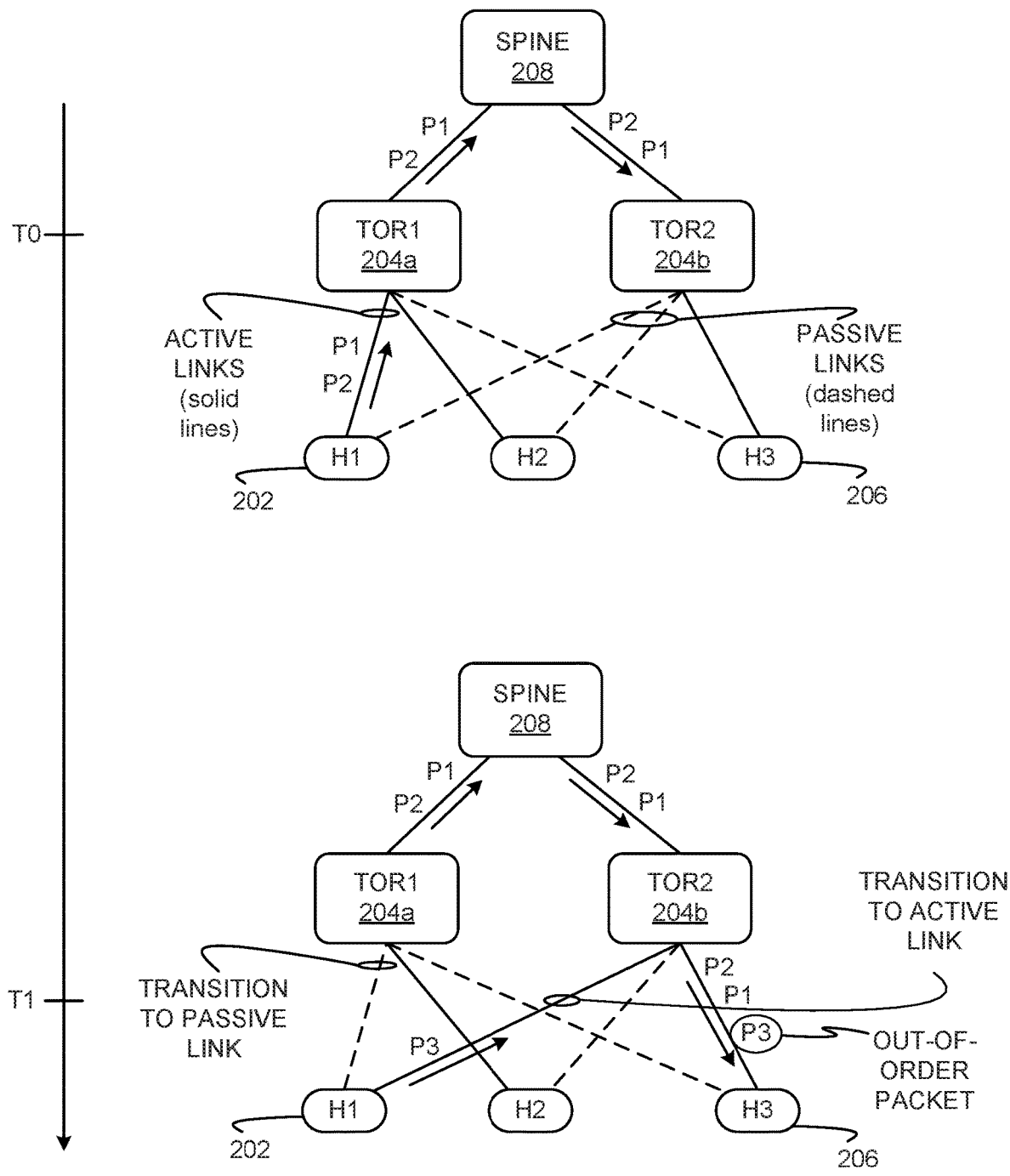
FIG. 2 illustrates how prior communication techniques produce out-of-order packets after active link migration of an LBT configuration.

FIG. 2 illustrates how prior communication techniques produce out-of-order packets during active link transition of an LBT configuration. As described above in connection with FIG. 1, an LBT policy causes switching an active link between TOR switches if a load on the active link exceeds 75%. Such active link transition may cause packets to arrive out-of-order at the destination host. Such out-of-ordering introduces a significant decrease in computing performance because the destination host employs resources to reassemble out-of-order packets into the correct order. In some instances, such receiving of out-of-order packets has significant consequences for block transfer applications like software-defined storage (e.g., VMware vSAN™ network data storage virtualization) and Internet Small Computer Systems Interface (iSCSI), which drop all packets in a block based on out-of-order receipt even if there is only a single out-of-order packet in the block. In such instances, the entire dropped block is re-transmitted by the source host. This results in additional use of network resources which can lead to network congestion.

In FIG. 2, a multi-fabric network environment is shown at a first time (T0) and a second time (T1). In the illustrated example of FIG. 2, the first time (T0) and the second time (T1) represent different durations of operations of the multi-fabric network environment. In the example of FIG. 2, solid lines between TOR switches and hosts represent active links of an LBT configuration, and dashed lines between TOR switches and hosts represent passive links of the LBT configuration. During the first time (T0), an active link is established between a host H1 202 and a first TOR switch (TOR1) 204a, and the host H1 202 sends packets P1 and P2 (to a destination host H3 206) via the active link. After the first time (T0), the host H1 202 changes its active link from TOR1 204a to a second TOR switch (TOR2) 204b, as shown at the second time (T1). As shown at the second time (T1) of FIG. 2, the host H1 202 sends a next packet P3 on the new active link. To reach the destination host H3 206, the first-transmitted packets P1 and P2 flow along a network path from the first TOR switch (TOR1) 204a, and through a spine switch 208 and the second TOR switch (TOR2) 204b. However, the packet P3 traverses a shorter network path from the second TOR switch (TOR2) 204b to the destination host H3 206. As such, the packet P3 reaches the destination host H3 206 before packets P1 and P2, which propagate along the longer path through the spine switch 208. Such out-of-order receipt of the packets P1, P2, P3 at the destination host H3 206 has significant performance consequences on network-based communications and applications. The cause of the out-or-order delivery problem is that, when an active link from a host migrates between different TOR switches, existing traffic flows also migrate to traverse the new TOR switch. This can result in pre-migration-transmitted packets (e.g., packets transmitted by a source host before active link migration) taking a longer path than post-migration-transmitted packets (e.g., packets transmitted by the same source host after active link migration) that follow a shorter path and arrive at a destination host before (e.g., out of order) than the pre-migration-transmitted packets.

Figure 3:
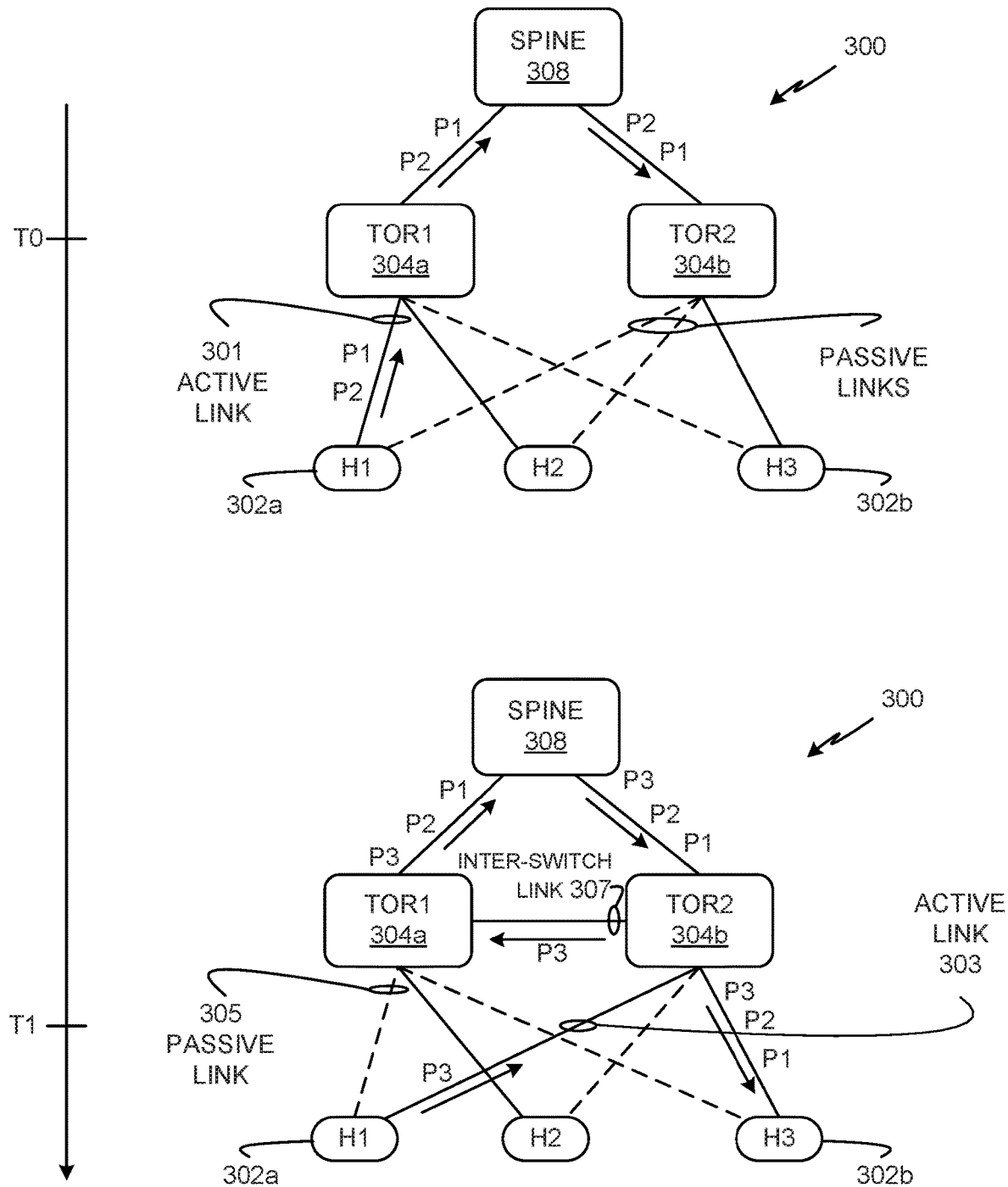
FIG. 3 illustrates packet-order preservation using an inter-switch link between TOR switches in accordance with teachings of this disclosure.

FIG. 3 illustrates packet-order preservation using an inter-switch link between TOR switches in accordance with teachings of this disclosure. The example use of an inter-switch link between TOR switches described in connection with FIG. 3 overcomes the problem of out-of-order packet receipt by transmitting post-migration-transmitted packets along a same network path used by pre-migration-transmitted packets so that pre-migration-transmitted packets and post-migration-transmitted packets are received at a destination host even when an active link migrates between different TOR switches between a time during which one or more pre-migration-transmitted packets are transmitted by a source host and a subsequent time during which one or more post-migration-transmitted packets are transmitted by the source host.

In FIG. 3, a multi-fabric network environment 300 is shown at a pre-migration time (T0) (e.g., a first time) and a post-migration time (T1) (e.g., a second time). In the illustrated example of FIG. 3, the pre-migration time (T0) and the post-migration time (T1) represent different durations of operations of the multi-fabric network environment 300. In the example of FIG. 3, solid lines between TOR switches and hosts represent active links of an LBT configuration, and dashed lines between TOR switches and hosts represent passive links of the LBT configuration. During the pre-migration time (T0) of FIG. 3, an active link 301 is established between a source host H1 302a and a first TOR switch (TOR1) 304a, and the source host H1 302a sends packets P1 and P2 to the first TOR switch (TOR1) 304a via the active link 301. The packets P1, P2 are pre-migration-transmitted packets that are destined to a destination host H3 302b via the first TOR switch (TOR1) 304a, an example spine switch 308, and the second TOR switch (TOR2) 304b.

After the pre-migration time (T0), the source host H1 302a migrates its active link from TOR1 304a to a second TOR switch (TOR2) 304b, as shown at the post-migration time (T1). As shown at the post-migration time (T1) of FIG. 2, the source host H1 302a establishes an example active link 303 with the second TOR switch (TOR2) 304b, and the previous active link 301 between the source host H1 302a and the first TOR switch (TOR1) 304a at the pre-migration time (T0) transitions to a passive link 305 at the post-migration time (T1).

At the example post-migration time (T1) of FIG. 3, the source host H1 302a sends a next packet P3 on the new active link 303. The packet P3 is a post-migration-transmitted packet that is also destined to the destination host H3 302b. However, at the post-migration time (T1) of FIG. 3 the network path between the source host H1 302a and the destination host H3 302b via the second TOR switch (TOR2) 304b is a shorter network path relative to the longer pre-migration network path for the pre-migration-transmitted packets P1, P2 which includes the first TOR switch (TOR1) 304a, the spine switch 308, and the second TOR switch (TOR2) 304b. To preserve an ordering of the packets P1, P2, P3 in accordance with teachings of this disclosure, the first and second TOR switches 304a,b establish an example inter-switch link 307 therebetween. The second TOR switch 304b uses the inter-switch link 307 to transmit the post-migration-transmitted packet P3 to follow the same pre-migration network path as the pre-migration-transmitted packets P1, P2. For example, the second TOR switch (TOR2) 304b transmits the post-migration-transmitted packet P3 across the inter-switch link 307 to the first TOR switch (TOR1) 304a. In this manner, the post-migration-transmitted packet P3 arrives at the first TOR switch (TOR1) 304a after the pre-migration-transmitted packets P1, P2 arrive at the first TOR switch (TOR2) 304a at the first time (T0). Such ordering of receipt of the post-migration-transmitted packet P3 at the first TOR switch (TOR1) 304a after receipt of the pre-migration-transmitted packets P1, P2 results in the first TOR switch (TOR1) 304a transmitting the packets P1, P2, P3 in the correct order to an example spine switch 308 along a pre-migration network path toward the destination host H3 302b. In the illustrated example, the correct order is the first packet P1 followed by the second packet P2 followed by the third packet P3. As shown in the example second time (T1) of FIG. 3, the packets P1, P2, P3 remain in the same order as they are transmitted by the spine switch 308 to the second TOR switch (TOR2) 304b, and from the second TOR switch (TOR2) 304b to the destination host H3 302b.

Accordingly, as shown in FIG. 3, establishing the example inter-switch link 307 between the first TOR switch (TOR1) 304a and the second TOR switch (TOR2) 304b enables preserving ordering of packets for receipt by the destination host H3 302b even when such packets are transmitted by the source host H1 302 across different active links and different TOR switches. For example, in the illustrated example of FIG. 3, the inter-switch link 307 re-joins a later-transmitted packet P3 to a pre-migration network path traversed by one or more earlier-transmitted packet(s) P1, P2. In this manner, the later-transmitted packet P3 can follow the same network path after the earlier-transmitted packet(s) P1, P2 so that the destination host H3 302b receives the earlier transmitted packet(s) P1, P2 before the later-transmitted packet P3 in an intended packet ordering (e.g., a correct packet ordering).

Figure 4:
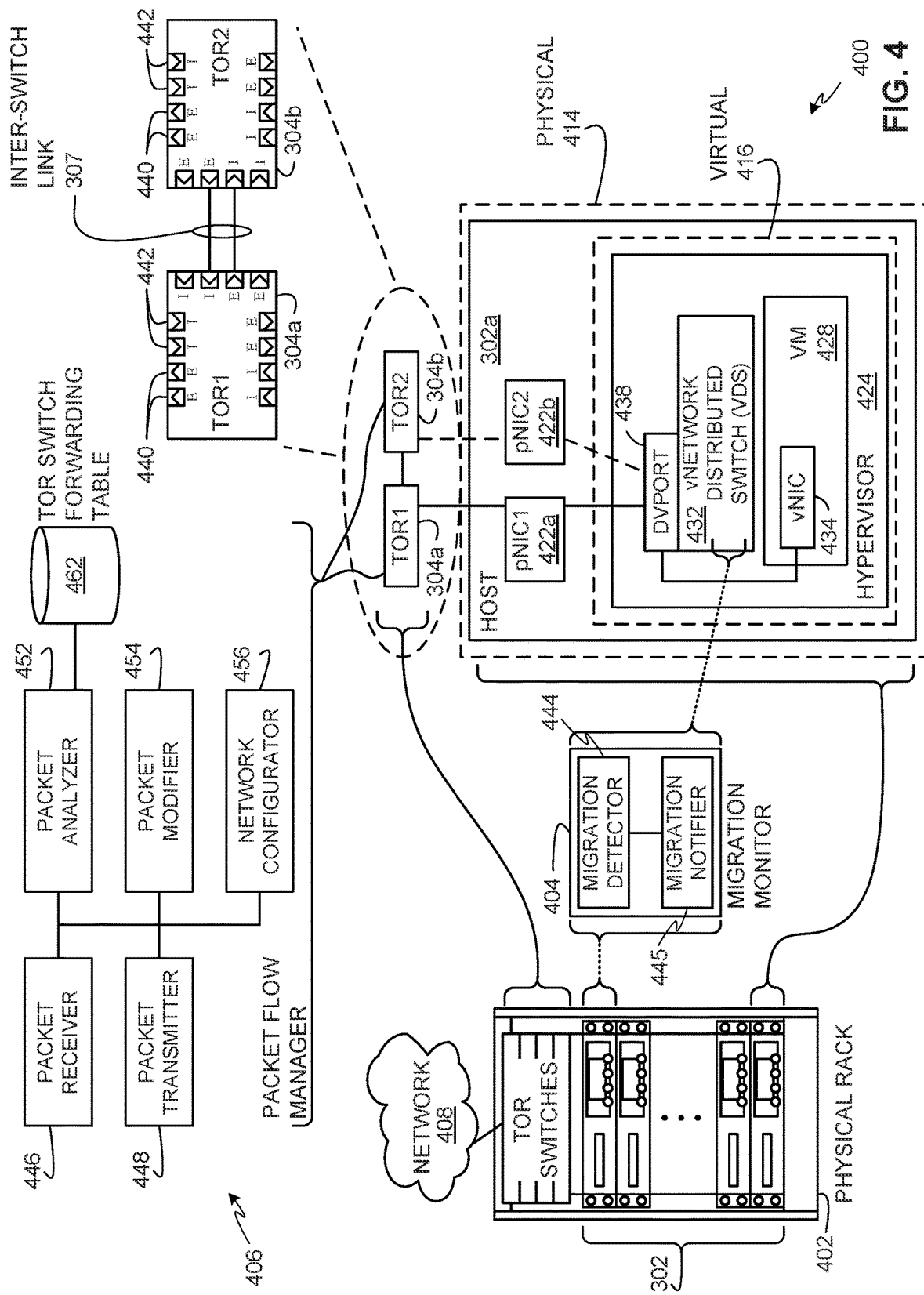
FIG. 4 is a block diagram of example apparatus in an example environment to preserve packet order after active link migration in accordance with teachings of this disclosure.

FIG. 4 is a block diagram of an example environment 400 in which the TOR switches 304a,b and hosts 302a,b of FIG. 3 are in a physical rack 402. In FIG. 4, an example migration monitor 404 monitors for active link migrations in the example environment 400, and an example packet flow manager 406 establishes the inter-switch link 307 (FIG. 3) and modifies routes of packets across the inter-switch link 307 to preserve packet ordering as described above in connection with FIG. 3. In the illustrated example, the physical rack 402 is a combination of computing hardware and installed software that may be used by a customer to create and/or add to a virtual computing environment for running VMs and/or containers. The physical rack 402 of the illustrated example can include upwards of 24 hosts 302 which include the hosts 302a,b of FIG. 3. The example hosts 302 are in network communication with the TOR switches 304a,b to enable network communications between the hosts 302 through the TOR switches 304a,b. In some examples, the physical rack 402 is physically connected to an external network 408 via the TOR switches 304a,b. In other examples, the TOR switches 304a,b are connected to the external network 408 via a spine switch such as the spine switch 308 of FIG. 3. In some examples, the spine switch 308 can also be used to interconnect the TOR switches 304a,b of the physical rack 402 with other physical racks (e.g., other physical racks in a network environment such as a cloud computing environment).

An example block diagram of the source host H1 302a of FIG. 3 is shown in FIG. 4. The destination host H3 302b of FIG. 3 is substantially similar or identical to the source host H1 302a. In the illustrated example of FIG. 4, a physical environment 414 and a virtual environment 416 of the host 302a are shown in detail as connected to the first TOR switch 304a and the second TOR switch 304b. The example physical environment 414 includes the hardware-level components of the host 302a which may include one or more central processor units (CPUs), one or more memory devices, one or more storage units, one or more graphics processor units (GPUs), one or more pNICs, etc. In the illustrated example, two pNICs 422a-b are provided in the host 302a. In other examples, more pNICs (e.g., four pNICs) may be provided in the host 302a. The pNICs 422a,b enable physical network connections between the host 302a and the TOR switches 304a,b.

In the illustrated example of FIG. 4, the host 302a executes an example hypervisor 424, which provides local virtualization services to create the example virtual environment 416 in the host 302a. The example hypervisor 424 may be implemented using any suitable hypervisor (e.g., VMWARE® ESX® hypervisor, Microsoft HYPER-V® hypervisor, and Kernel Based Virtual Machine (KVM)). In the illustrated example of FIG. 4, the hypervisor 424 executes one or more VMs (e.g., an example VM 428) and an example virtual network (vnetwork) distributed switch (VDS) 432. The example VDS 432 functions as a single virtual switch that can be deployed in a single host and/or across multiple hosts. This enables setting virtual network configurations that span across all the member hosts of the VDS 432 and allows VMs to maintain consistent virtual network configurations even when such any such VM is migrated across the multiple member hosts. In the illustrated example, the VM 428 is configured to include a vNIC 434 (although additional vNICs may be configured) for use by applications executed by the VM 428 to perform network communications via the network 408. The example vNIC 434 is created by running virtualization services that enable the VM 428 to employ the pNICs 422a,b of the host 302a through the VDS 432 for network communications. In the illustrated example, the first and second pNICs 422a,b are allocated as physical resources by the hypervisor 424 for use by the VDS 432 and the VM 428 in providing virtual network resources. For example, the hypervisor 424 instantiates a vNIC 434 as a virtual network interface resource, and the VDS 432 instantiates a dvport 438 through which the vNIC 434 connects to the allocated pNICs 422a,b. The example vNIC 434 connects to the TOR switches 304a,b via the pNICs 422a,b. In the illustrated example, the vNIC 434 connects to the pNICs 422a,b through the dvport 438 and the VDS 432 such that the pNICs 422a,b are connected to the VDS 432 and exchange network packets with the vNIC 434 via the VDS 432. The example dvport 438 is assigned a port number by the VDS 432 to identify a source/destination side of a connection that terminates at the hypervisor 424. The VDS 432 uses the port number of the dvport 438 to determine the vNIC 434 and the applications to which received network communications should be delivered.

In the illustrated example, since the TOR switches 304a,b implement an LBT load balancing policy in Active-Passive mode in which a dvport can be active on only one pNIC at a time, the dvport 438 connects to the first TOR switch 304a through the first pNIC 422a via an active link (shown by a solid line) and connects to the second TOR switch 304b through the second pNIC 422b via a passive link (shown by a dashed line). The pNIC 422a may be also be allocated to other vNICs. As such, a total utilization of the pNIC 422a is dependent on the cumulative traffic across all of the vNICs that are assigned to the pNIC 422a. In accordance with an LBT policy, when the pNIC 422a reaches greater than 75% utilization of its bandwidth capacity by all of the vNICs assigned to it, the second pNIC 422b is switched from a passive link to an active link for the vNIC 434, and the first pNIC 422a is switched from an active link to a passive link for the vNIC 434.

The example TOR switches 304a,b are shown in a magnified view in FIG. 4 to show egress ports and ingress ports for receiving and transmitting packets between the two TOR switches 304a,b, between the TOR switches 304a,b and host nodes (e.g., the hosts 302a,b of FIG. 3), and between the TOR switches 304a,b and a spine switch (e.g., the spine switch 308 of FIG. 3). In the illustrated example of FIG. 4, egress ports for outgoing packets are identified by a capital letter "E" and some are indicated by reference numeral 440, and ingress ports for incoming packets are identified by a capital letter "I" and some are indicated by reference numeral 442. In the illustrated example, when an LBT load balancing policy is implemented in the TOR switches 304a,b, some or all of the egress ports 440 and ingress ports 442 are configured as LBT ports (e.g., LBT egress ports 440 and LBT ingress ports 442) for use in accordance with the LBT load balancing policy. In the illustrated example, the inter-switch link 307 of FIG. 3 is shown as implemented by two LBT links between the TOR switches 304a,b in which a first LBT link is formed between an LBT egress port 440 of the second TOR switch 304b and an LBT ingress port 442 of the first TOR switch 304a, and a second LBT link is formed between an LBT egress port 440 of the first TOR switch 304a and an LBT ingress port 442 of the second TOR switch 304b.

Now turning in detail to the example migration monitor 404 of FIG. 4, the migration monitor 404 is provided to monitor for migrations between active links and passive links that are configured in accordance with an LBT policy. In the illustrated example, the migration monitor 404 may be implemented in the example VDS 432 of the host 302a or in an example virtual cloud manager. An example virtual cloud manager that may be used with examples disclosed herein is the VMware Cloud Foundation (VCF) platform developed and provided by VMware, Inc. The virtual cloud manager manages different parameters of the TOR switches 304a,b and the spine switch 308 (e.g., to manage a software defined data center (SDDC) platform). In some examples, the virtual cloud manager commands different components even when such components run different OSs. In the illustrated example, the virtual cloud manager is implemented by the hypervisor 424.

The example migration monitor 404 includes an example migration detector 444 and an example migration notifier 445. The example migration detector 444 is provided to detect when an active link between a host and a TOR switch migrates to an active link between the host and another TOR switch. For example, when the active link 301 (FIG. 3) between the source host H1 302a and the first TOR switch (TOR1) 304a at the first time (T0) migrates to the active link 303 (FIG. 3) between the source host H1 302a and the second TOR switch (TOR 2) 304b, the migration detector 444 detects such migration. The example migration notifier 445 notifies the corresponding TOR switch of the new active link of the active link migration based on (e.g., in response to) the migration detector 444 detecting the active link migration. The notification from the example migration notifier 445 causes updated configurations in the TOR switch of the new active link so that the TOR switch establishes an inter-switch link (e.g., the inter-switch link 307) and communicates post-migration-transmitted packets across the inter-switch link so that the post-migration-transmitted packets follow the same network path as pre-migration-transmitted packets.

When the example migration monitor 404 is implemented in a virtual cloud manager (e.g., in the hypervisor 424), the migration detector 444 detects an active link migration in the hypervisor 424 by, for example, polling the VDS 432 for changes of active links in its VDS routing table. In the examples of FIGS. 3 and 4, when the VDS routing table reflects a migration of the active link 301 from the first TOR switches 304a to the active link 303 of the second TOR switch 304b, the VDS 432 sends a response message to the virtual cloud manager with details of the active link migration. Example active link migration details include an internet protocol (IP) address of a corresponding vNIC (e.g., the vNIC 434) and a media access control (MAC) address of the second TOR switch 304b to which the active link is migrated. In this manner, the virtual cloud manager implementing the migration monitor 404 configures the second TOR switch 304b to send post-migration-transmitted packets of previously established flows along pre-migration network paths by transmitting the post-migration-transmitted packets across an inter-switch link. In response to the detection of the active link migration, the migration notifier 445 sends a migration notification message to the second TOR switch 304b notifying of the active link migration. The migration notification message includes configuration information to configure the second TOR switch 304b to establish the inter-switch link 307 with the first TOR switch 304a.

When the example migration monitor 404 is implemented in the VDS 432, the migration detector 444 detects an active link migration by detecting changes of active links in its VDS routing table. In the examples of FIGS. 3 and 4, when the migration detector 444 in the VDS 432 detects an active link migration in the VDS routing table of the VDS 432, such as a migration of the active link 301 from the first TOR switches 304a to the active link 303 of the second TOR switch 304b, the migration notifier 445 sends a migration notification message to the second TOR switch 304b notifying of the active link migration. When the migration monitor 404 is implemented by the VDS 432, the migration notification message sent by the migration notifier 445 is a Gratuitous Address Resolution Protocol (GARP) message. A GARP is a response not prompted by an ARP request. In the illustrated examples of FIGS. 3 and 4, the TOR switches 304a,b listen for GARP messages and, upon receipt of such a GARP message, the second TOR switches 304b can auto configure itself to send post-migration-transmitted packets of previously established flows along pre-migration network paths by transmitting the post-migration-transmitted packets across an inter-switch link.

When the example migration monitor 404 is implemented in the virtual cloud manager (e.g., in the hypervisor 424) or the VDS 432, configuration information in the migration notification message generated by the migration notifier 445 includes a MAC address of the second TOR switch 304b to identify the TOR switch with which to establish the inter-switch link 307. The configuration information also includes destination addresses (e.g., MAC addresses of destination hosts) of packets that are to be forwarded over the inter-switch link 307. For example, in the illustrated example of FIGS. 3 and 4, the configuration information includes the destination address of the destination host H2 302b. In this manner, when the second TOR switch 304b receives the post-migration transmitted packet P3 (FIG. 3), the second TOR switch 304b detects the destination address of the destination host 302b in the post-migration transmitted packet P3, and transmits the post-migration transmitted packet P3 to the first TOR switch 304a via the inter-switch link 307.

Turning in detail to the example packet flow manager 406, for ease of illustration, only a single packet flow manager 406 is shown in the illustrated example of FIG. 4. However, it should be understood that substantially the same packet flow manager 406 is implemented in both of the TOR switches 304a,b. In the illustrated example, the packet flow manager 406 is provided with an example packet receiver 446, an example packet transmitter 448, an example packet analyzer 452, an example packet modifier 454, and an example network configurator 456. The example packet flow manager 406 is provided with the packet receiver 446 to receive packets (e.g., the packets P1, P2, P3 of FIG. 3). The example packet flow manager 406 is provided with the packet transmitter 448 to transmit packets.

The packet flow manager 406 is provided with the example network configurator 456 to establish and/or configure inter-switch links (e.g., the inter-switch link 307) between the TOR switches 304a,b and to store destination addresses in an example TOR switch forwarding table 462. For example, the network configurator 456 receives a migration notification message from the migration notifier 445 of the migration monitor 404 and reads the configuration information in the migration notification message. As described above, example configuration information includes a MAC address of the TOR switch with which to establish an inter-switch link (e.g., the inter-switch link 307), and includes destination addresses of destination hosts (e.g., the destination host H3 302b) for which post-migration-transmitted packets are to be transmitted via the inter-switch link. In the examples of FIGS. 3 and 4, the network configurator 456 of the second TOR switch 304b establishes the inter-switch link 307 with the first TOR switch 304a based on the MAC address of the first TOR switch 304a in the configuration information.

In addition, the example network configurator 456 stores the destination address(es) of post-migration-transmitted packets in the TOR switch forwarding table 462 for use in subsequent forwarding of the post-migration-transmitted packets via the inter-switch link 307. The example TOR switch forwarding table 462 may be stored in any suitable memory and/or storage device(s) (e.g., the volatile memory 614, the nonvolatile memory 616, the mass storage 628, and/or the local memory 613 of FIG. 6) of the TOR switch 304a,b. In the illustrated example, the TOR switch 304a,b includes the TOR switch forwarding table 462 to store MAC addresses of pNICs of destination hosts for which post-migration-transmitted packets are to be forwarded via the inter-switch link 307 so that the post-migration-transmitted packets follow the same network path as pre-migration-transmitted packets in the same flow destined to the same destination host H3 302b. In this manner, by using the inter-switch link 307 in this manner, packet ordering of the pre-migration-transmitted packets and the post-migration-transmitted packets is preserved.

The example packet flow manager 406 is provided with the packet analyzer 452 to analyze information in received packets. For example, the packet analyzer 452 implemented in the second TOR switch 304b may analyze a destination address (e.g., a MAC address) in a destination address field of an L2 header of a packet to determine whether the packet is a post-migration-transmitted packet of a pre-existing flow that is to be forwarded via the inter-switch link 307. In the illustrated example, the packet analyzer 452 compares the destination addresses of the received packet to destination addresses stored in an example TOR switch forwarding table 462.

The packet flow manager 406 is provided with the example packet modifier 454 to modify post-migration-transmitted packets to be transmitted via an inter-switch link. For example, after the packet analyzer 452 confirms that the received packet P3 (FIG. 3) is a post-migration-transmitted packet P3 belonging to a pre-migration flow based on a destination address in the TOR switch forwarding table 462, the packet modifier 454 modifies an L2 header of the post-migration-transmitted packet P3 to flow via the inter-switch link 307 from the second TOR switch 304b to the first TOR switch 304a.

While example manners of implementing the migration monitor 404 and the packet flow manager 406 are illustrated in FIG. 4, one or more of the elements, processes and/or devices illustrated in FIG. 4 may be combined, divided, re-arranged, omitted, eliminated and/or implemented in any other way. Further, the example migration detector 444, the example migration notifier 445, the example packet receiver 446, the example packet transmitter 448, the example packet analyzer 452, the example packet modifier 454, the example network configurator 456, the example TOR switch forwarding table 462 and/or, more generally, the example the migration monitor 404 and/or the packet flow manager 406 of FIG. 4 may be implemented by hardware, software, firmware and/or any combination of hardware, software and/or firmware. Thus, for example, any of the example migration detector 444, the example migration notifier 445, the example packet receiver 446, the example packet transmitter 448, the example packet analyzer 452, the example packet modifier 454, the example network configurator 456, the example TOR switch forwarding table 462 and/or, more generally, the example the migration monitor 404 and/or the packet flow manager 406 could be implemented by one or more analog or digital circuit(s), logic circuits, programmable processor(s), programmable controller(s), graphics processor unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example migration detector 444, the example migration notifier 445, the example packet receiver 446, the example packet transmitter 448, the example packet analyzer 452, the example packet modifier 454, and/or the example network configurator 456, the example TOR switch forwarding table 462 is/are hereby expressly defined to include a non-transitory computer readable storage device or storage disk such as a memory, a digital versatile disk (DVD), a compact disk (CD), a Blu-ray disk, etc. including the software and/or firmware. Further still, the example the migration monitor 404 and/or the packet flow manager 406 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
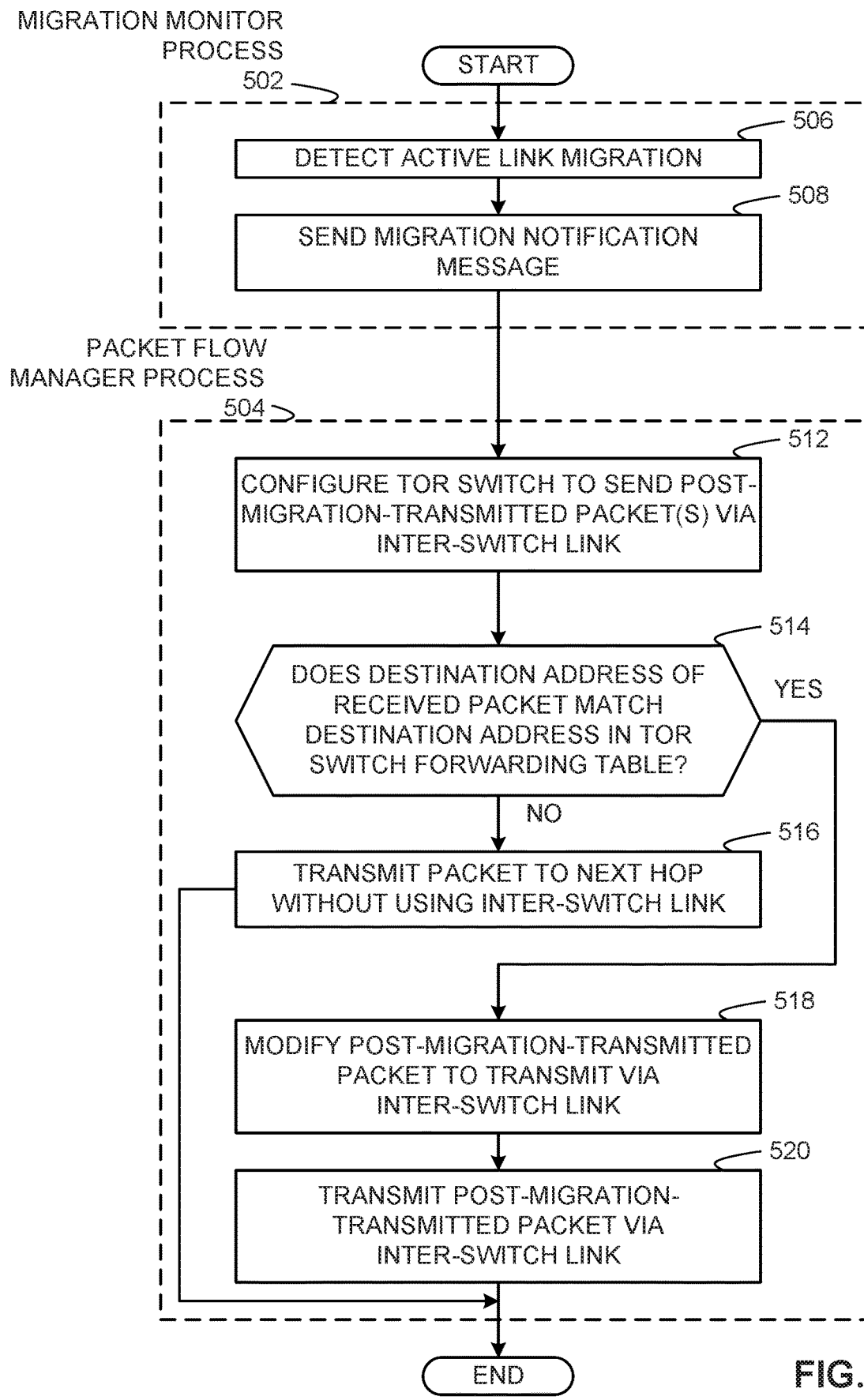
FIG. 5 is a flowchart representative of example machine-readable instructions that may be executed to implement the apparatus of FIG. 4 to preserve packet order after active link migration in accordance with teachings of this disclosure.

An example flowchart of FIG. 5 is representative of example hardware logic, machine readable instructions, hardware-implemented state machines, and/or any combination thereof for implementing the example migration monitor 404 and/or the example packet flow manager 406 of FIG. 4. The machine-readable instructions may be one or more executable programs or portion(s) of one or more executable programs for execution by a computer processor such as the processor 612 shown in the example processor platform 600 discussed below in connection with FIG. 6. The program(s) may be embodied in software stored on a non-transitory computer readable storage medium such as a CD-ROM, a floppy disk, a hard drive, a DVD, a Blu-ray disk, or a memory associated with the processor 612, but the entirety of the program(s) and/or parts thereof could alternatively be executed by a device other than the processor 612 and/or embodied in firmware or dedicated hardware. Further, although the example program(s) is/are described with reference to the flowchart illustrated in FIG. 5, many other methods of implementing the example the migration monitor 404 and/or the packet flow manager 406 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions disclosed herein may be stored in one or more of a compressed format, an encrypted format, a fragmented format, a packaged format, etc. Machine readable instructions as disclosed herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The flowchart of FIG. 5 includes example migration monitor instructions 502 and example packet flow manager instructions 504. The example migration monitor instructions 502 may be executed to implement the migration monitor 404 of FIG. 4, and the example packet flow manager instructions 504 may be executed to implement the packet flow manager 406 of FIG. 4. The program(s) of FIG. 5 begin at block 506 of the example migration monitor instructions 502 at which the migration detector 444 (FIG. 4) detects an active link migration of a first active link to a second active link that is connected between a first host and a second TOR switch. For example, after the source host H1 302a (FIGS. 3 and 4) (e.g., a first host) sends a first packet (e.g., the pre-migration-transmitted packet P1 of FIG. 3) of a first packet flow (e.g., a pre-migration packet flow) via a first active link (e.g., the active link 301 of FIG. 3) that is connected between the source host H1 302a and the first TOR switch 304a, the migration detector 444 detects the active link migration of the first active link 301 to the second active link 303 (FIG. 3). The second active link 303 is connected between the source host H1 302a and the second TOR switch 304b. In such example, the first packet P1 is destined to the destination host H3 302b connected to the second TOR switch 304b.

At block 508, the migration notifier 445 (FIG. 4) sends a migration notification message (e.g., in response to the active link migration) to the second TOR switch 304b. The migration notification message is to cause configuration of the second TOR switch 304b to send a subsequent packet of the first packet flow (e.g., the pre-migration flow) to the first TOR switch 304a via the inter-switch link 307 between the first and second TOR switches 304a,b. For example, the subsequent packet is the post-migration-transmitted packet P3 of FIG. 3 destined to the destination host H3 302b.

Turning to the example packet flow manager instructions 504, the network configurator 456 (FIG. 4) configures the second TOR switch 304b to send post-migration-transmitted packets to the first TOR switch 304a via the inter-switch link 307 (block 512). For example, the network configurator 456 retrieves configuration information from the migration notification message which includes the MAC address of the first TOR switch 304a, and one or more destination address(es) of post-migration-transmitted packets that are to be transmitted across the inter-switch link 307. The example network configurator 456 uses the MAC address of the first TOR switch 304a to establish the inter-switch link 307 with the first TOR switch 304a. In addition, the example network configurator 456 stores the destination address(es) of the post-migration-transmitted packets in the TOR switch forwarding table 462 (FIG. 4).

At block 514, the example packet analyzer 452 determines whether a destination address of a received packet matches a destination address stored in the TOR switch forwarding table 462. For example, the packet analyzer 452 compares a destination address in the received packet against one or more destination address(es) in the TOR switch forwarding table 462 to determine whether the received packet is to be transmitted via the inter-switch link 307. If the packet analyzer 452 determines at block 514 that there is not a match between the destination address in the received packet and a destination address in the TOR switch forwarding table 462, the packet transmitter 448 (FIG. 4) transmits the packet to a next hop without using the inter-switch link 307 (block 516). However, if the packet analyzer 452 determines at block 514 that there is a match between the destination address in the received packet and a destination address in the TOR switch forwarding table 462, the received packet is a post-migration-transmitted packet belonging to a pre-migration flow such as the post-migration-transmitted packet P3 (FIG. 3). In such case, the example packet modifier 454 (FIG. 4) modifies the post-migration-transmitted packet P3 to be transmitted via the inter-switch link 307 (block 518). For example, the packet modifier 454 modifies an L2 header of the post-migration-transmitted packet P3 to include the MAC address of the first TOR switch 304a so that a next hop of the post-migration-transmitted packet P3 is identified as the first TOR switch 304a to be reached via the inter-switch link 307. At block 520, the packet transmitter 448 (FIG. 4) transmits the post-migration-transmitted packet P3 via the inter-switch link 307. For example, the packet transmitter 448 of the second TOR switch 304b uses the next hop MAC address located in the L2 header of the post-migration-transmitted packet P3 to identify the first TOR switch 304a, and transmits the post-migration-transmitted packet P3 from the second TOR switch 304b to the first TOR switch 304b based on the next hop MAC address. The processes implemented by the example instructions of FIG. 5 end. However, the example processes may be repeated any number of times for any number of detected active link migrations and/or any number of packets transmitted between source and destination hosts.

Figure 6:
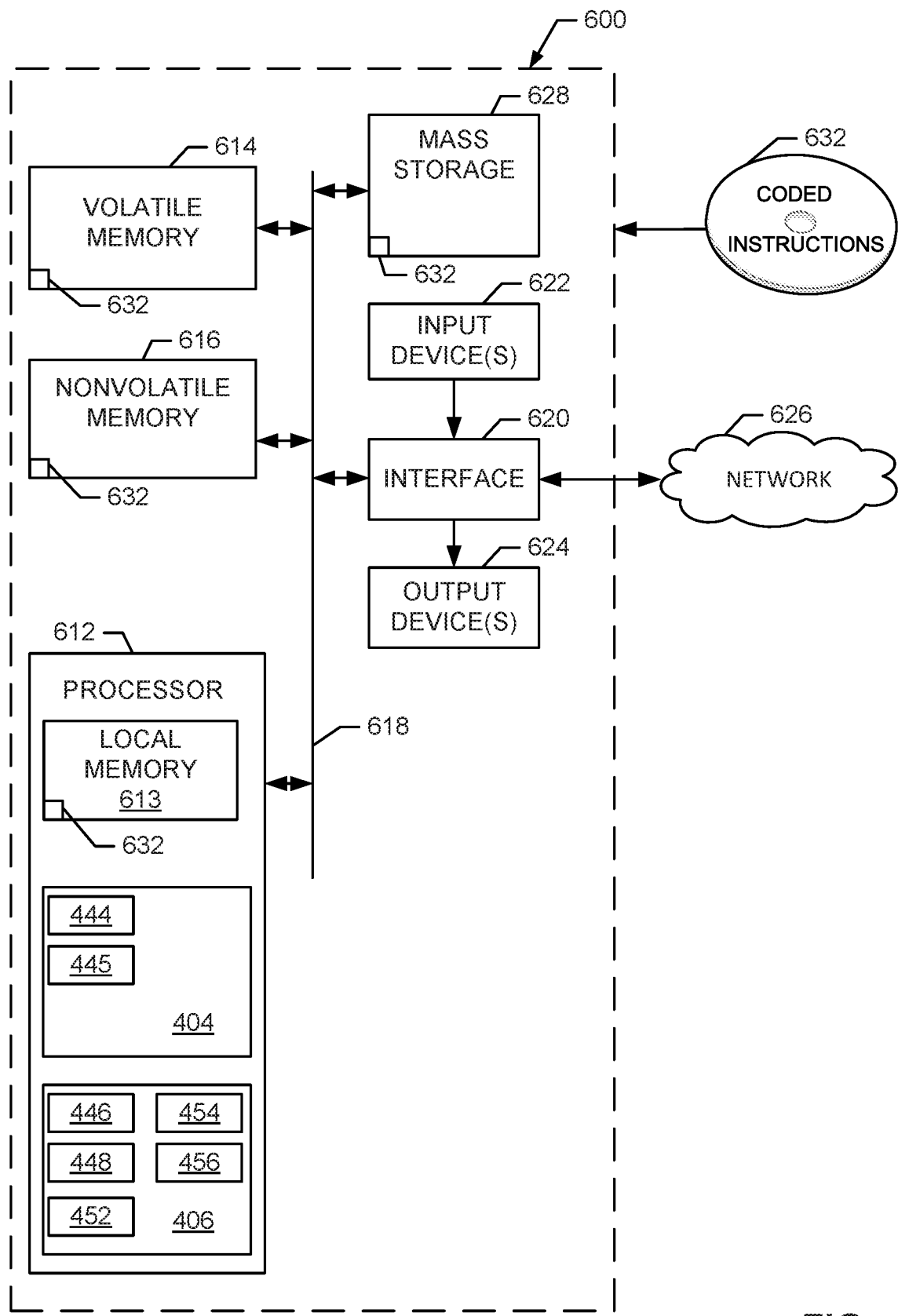
FIG. 6 is a block diagram of an example processor platform structured to execute the machine-readable instructions represented in FIG. 5 to implement the apparatus of FIG. 4 to preserve packet order after active link migration in accordance with teachings of this disclosure.

FIG. 6 is a block diagram of an example processor platform 600 structured to execute the machine-readable instructions represented in FIG. 5 to implement the example migration monitor 404 and/or the example packet flow manager 406 of FIG. 4 to preserve packet ordering by establishing an inter-switch link (e.g., the inter-switch link 307) between TOR switches (e.g., the TOR switches 304a,b of FIGS. 3 and 4) and causing post-migration-transmitted packets to flow via the inter-switch link (e.g., the inter-switch link 307). The processor platform 600 can be, for example, a server, a personal computer, a workstation, a self-learning machine (e.g., a neural network), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor 612 may be a semiconductor based (e.g., silicon based) device. In this example, when the processor platform 600 implements the migration monitor 404, the processor 612 implements the example migration detector 444 and the migration notifier 445. Alternatively, when the processor platform 600 implements the packet flow manager 406 of FIG. 4, the processor 612 implements the example packet receiver 446, the example packet transmitter 448, the example packet analyzer 452, the example packet modifier 454, and the example network configurator 456 of the example packet flow manager 406. In operation, a first processor platform substantially similar or identical to the processor platform 600 implements the migration monitor 404 while a second processor platform substantially similar or identical to the processor platform 600 concurrently implements the packet flow manager 406.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

Example machine executable-instructions 632 represented by the flowchart of FIG. 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed to preserve packet order of pre-migration-transmitted packets and post-migration-transmitted packets after active link migration based on LBT policies. Out-of-ordering of transmitted packets introduces a significant decrease in network performance and computing performance because a destination host employs resources to reassemble out-of-order packets into the correct order. In some instances, such out-of-order packet receipt has other significant consequences for block transfer applications like software-defined storage (e.g., VMware vSAN™ network data storage virtualization) and Internet Small Computer Systems Interface (iSCSI), which drop all packets in a block based on out-of-order receipt even if there is only a single out-of-order packet in the block. In such instances, the entire dropped block is re-transmitted by the source host. This results in additional use of network resources which can lead to network congestion. Examples disclosed herein substantially reduce or eliminate receiving packets out of order at a destination host by using an inter-switch link between TOR switches so that post-migration-transmitted packets follow a same network path as pre-migration-transmitted packets. In doing so, packets are received by a destination host in a correct order. In this manner, examples disclosed herein reduce processing resources and memory resources of the destination host by not requiring the destination host to reassemble the received packets in correct order. In addition, examples disclosed herein reduce processing resources and memory resources of a source host by not requiring the source host to re-transmit the packets based on previously transmitted packets being received out of order at the destination host. Examples disclosed herein also preserver network resources by not requiring a network to propagate re-transmitted packets based on previously transmitted packets being received out of order at the destination host.

Examples disclosed herein may be used with one or more different types of virtualization environments. Three example types of virtualization environments are: full virtualization, paravirtualization, and OS virtualization. Full virtualization, as used herein, is a virtualization environment in which hardware resources are managed by a hypervisor to provide virtual hardware resources to a VM. In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical RAM with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and/or an OS virtualization environment. In such a data center, a workload may be deployed to any of the virtualization environments. Examples disclosed herein may be implemented in any one or more of the multiple different virtualization environments.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to preserve packet order in a multi-fabric network, the apparatus comprising:
a migration detector to, after a first host sends a first packet of a first packet flow via a first active link between the first host and a first top-of-rack (TOR) switch, detect a migration of the first active link to a second active link between the first host and a second TOR switch, the first packet destined to a second host connected to the second TOR switch; and
a migration notifier to, in response to the migration, send a migration notification message to cause configuration of the second TOR switch to send a second packet of the first packet flow to the first TOR switch via an inter-switch link between the first and second TOR switches, the second packet destined to the second host.

2. The apparatus of claim 1, wherein the migration detector and the migration notifier are implemented by a virtual cloud manager in a hypervisor of the first host.

3. The apparatus of claim 2, wherein the migration detector is to detect the migration of the first active link to the second active link by detecting the migration in the hypervisor of the first host.

4. The apparatus of claim 1, wherein the migration detector and the migration notifier are implemented by a virtual distributed switch in the first host.

5. The apparatus of claim 4, wherein the migration notifier is to send the migration notification message from the virtual distributed switch of the first host to the second TOR switch.

6. The apparatus of claim 1, wherein the second TOR switch is to be configured by at least one of: (a) the second TOR switch autoconfiguring itself in response to the migration notification message, or (b) a virtual cloud manager implementing the migration notifier in a hypervisor of the first host.

7. The apparatus of claim 1, wherein the configuration of the second TOR switch to send the second packet of the first packet flow to the first TOR switch via the inter-switch link is to cause the second packet to flow along a same network path as the first packet, and the first packet to arrive at the second host before the second packet.

8. The apparatus of claim 1, wherein the migration notifier is to send the migration notification message to cause the configuration of the second TOR switch by sending a gratuitous address resolution protocol message from a virtual distributed switch of the first host to the second TOR switch.

9. A non-transitory computer readable storage medium comprising instructions that, when executed by one or more processors, cause the one or more processors to at least:
after a first host sends a first packet of a first packet flow via a first active link between the first host and a first top-of-rack (TOR) switch, detect a migration of the first active link to a second active link between the first host and a second TOR switch, the first packet destined to a second host connected to the second TOR switch; and
in response to the migration, send a migration notification message to cause configuration of the second TOR switch to send a second packet of the first packet flow to the first TOR switch via an inter-switch link between the first and second TOR switches, the second packet destined to the second host.

10. The non-transitory computer readable storage medium of claim 9, wherein the instructions cause the one or more processors to detect the migration of the first active link to the second active link by causing a virtual cloud manager to detect the migration in a hypervisor of the first host.

11. The non-transitory computer readable storage medium of claim 9, wherein the instructions cause the one or more processors to send the migration notification message by causing a virtual distributed switch to send the migration notification message from the first host to the second TOR switch.

12. The non-transitory computer readable storage medium of claim 9, wherein the second TOR switch is to be configured by at least one of: (a) the second TOR switch, or (b) a virtual cloud manager executing in a hypervisor of the first host.

13. The non-transitory computer readable storage medium of claim 9, wherein the configuration of the second TOR switch to send the second packet of the first packet flow to the first TOR switch via the inter-switch link is to cause the second packet to flow along a same network path as the first packet, and the first packet to arrive at the second host before the second packet.

14. The non-transitory computer readable storage medium of claim 9, wherein the instructions cause the one or more processors to send the migration notification message to cause the configuration of the second TOR switch by causing a virtual distributed switch to send a gratuitous address resolution protocol message from the first host to the second TOR switch.

15. A method to preserve packet order in a multi-fabric network, the method comprising:
    after a first host sends a first packet of a first packet flow via a first active link between the first host and a first top-of-rack (TOR) switch, detecting a migration of the first active link to a second active link between the first host and a second TOR switch, the first packet destined to a second host connected to the second TOR switch; and
    in response to the migration, sending a migration notification message to cause configuration of the second TOR switch to send a second packet of the first packet flow to the first TOR switch via an inter-switch link between the first and second TOR switches, the second packet destined to the second host.

16. The method of claim 15, wherein the detecting of the migration of the first active link to the second active link is based on a virtual cloud manager detecting the migration in a hypervisor of the first host.

17. The method of claim 15, wherein the sending of the migration notification message is performed by a virtual distributed switch sending the migration notification message from the first host to the second TOR switch.

18. The method of claim 15, wherein the configuration of the second TOR switch is to be performed by at least one of: (a) the second TOR switch, or (b) a virtual cloud manager executing in a hypervisor of the first host.

19. The method of claim 15, wherein the configuration of the second TOR switch to the second packet of the first packet flow to the first TOR switch via the inter-switch link is to cause the second packet to flow along a same network path as the first packet, and the first packet to arrive at the second host before the second packet.

20. The method of claim 15, wherein the sending of the migration notification message to cause the configuration of the second TOR switch is performed by sending a gratuitous address resolution protocol message from a virtual distributed switch of the first host to the second TOR switch.

* * * * *